(12) United States Patent
Hallak (10) Patent No.: US 9,112,403 B2
(45) Date of Patent: Aug. 18, 2015

(54) METHOD FOR REGULATING A BUCK/BOOST CONVERTER

(75) Inventor: Jalal Hallak, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 203 days.

(21) Appl. No.: 13/981,635

(22) PCT Filed: Nov. 9, 2011

(86) PCT No.: PCT/EP2011/069741
§ 371 (c)(1),
(2), (4) Date: Jul. 25, 2013

(87) PCT Pub. No.: WO2012/100853
PCT Pub. Date: Aug. 2, 2012

(65) Prior Publication Data
US 2013/0307508 A1 Nov. 21, 2013

(30) Foreign Application Priority Data

Jan. 25, 2011 (EP) ..................................... 11152043

(51) Int. Cl.
*G05F 1/00* (2006.01)
*H02M 3/04* (2006.01)
*H02M 3/158* (2006.01)

(52) U.S. Cl.
CPC .............. *H02M 3/04* (2013.01); *H02M 3/1582* (2013.01); *Y02B 70/1425* (2013.01)

(58) Field of Classification Search
CPC .................................... G05F 1/00; G05F 3/16
USPC .......... 323/222–225, 268, 271, 282, 284, 285
See application file for complete search history.

(56) References Cited

U.S. PATENT DOCUMENTS 6,166,527 A 12/2000 Dwelley et al.
7,863,872 B2 * 1/2011 Chiu ............................ 323/271

(Continued)

FOREIGN PATENT DOCUMENTS

CN 1877480 12/2006
CN 101828328 9/2010

(Continued)

OTHER PUBLICATIONS

A Novel Low-Loss Modulation Strategy for High-Power Bidirectional Buck + Boost Converters; Stefan Waffler, Student Member, IEEE, and Johann W. Kolar, Senior Memb er, IEEE; "A Novel Low-Loss Modulation Strategy for High-Power Bidirectional Buck + Boost Converters"; IEEE Transactions on Power Electronics, IEEE Service Center, Piscataway, NJ, US, Be. 24, No. 6, Jun. 1, 2009, Seiten 1589-1599, XP011262259, ISSN: 0885-8993; Absatz [000A]; Abbildung 2; Absatz [000D].

(Continued)

*Primary Examiner* — Matthew Nguyen
(74) *Attorney, Agent, or Firm* — Cozen O'Connor (57) ABSTRACT

A method for regulating a clocked buck/boost converter, wherein a buck converter switching element is driven at a common clock frequency with a first pulse-width-modulated switching signal and a boost converter switching element is driven with a second pulse-width-modulated switching signal to convert an input voltage into a regulated output voltage, and a regulator signal from an output voltage regulator is used to generate the first and second pulse width modulated switching signals such that the buck converter is operated in a discontinuous mode with quasi-resonant switching, where the inductor current or the current through the buck converter switching element is detected and compared with a reference current, where the regulator signal is amplified to the extent that the reference current is reached, in terms of time, before a turn-off pulse of the first pulse-width-modulated switching signal, and where the second pulse-width-modulated switching signal is generated using the amplified regulator signal.

12 Claims, 8 Drawing Sheets

(56) References Cited

U.S. PATENT DOCUMENTS

| 8,415,937 | B2* | 4/2013 | Hester | 323/282 |
|---|---|---|---|---|
| 2004/0239299 | A1 | 12/2004 | Vinciarelli | |
| 2009/0108820 | A1* | 4/2009 | Mirea | 323/271 |
| 2011/0089915 | A1* | 4/2011 | Qiu et al. | 323/271 |
| 2014/0084883 | A1* | 3/2014 | Tanabe | 323/271 |

FOREIGN PATENT DOCUMENTS

| DE | 4306070 | 10/1994 |
|---|---|---|
| DE | 10 2005 030 599 | 1/2007 |
| EP | 1 146 629 | 10/2001 |
| WO | WO 2009/033924 A2 | 3/2009 |

OTHER PUBLICATIONS

Zero-voltage switching in high frequency power converters using pulse width modulation; Henze C P et al; "Zero-voltage switching in high frequency power converters using pulse width modulation"; 19880201; 19880201-19880205; Feb. 1, 1988, Seiten 33-40, XP010070071, Absatz [0003]; Abbildung 4; CH2504-9/88/0000-0033 $1.00, 1988 IEEE.

* cited by examiner

METHOD FOR REGULATING A BUCK/BOOST CONVERTER

CROSS-REFERENCE TO RELATED APPLICATIONS

This is a U.S. national stage of application No. PCT/EP2011/069741 filed 9 Nov. 2011. Priority is claimed on European Application No. 11152043.3 filed 25 Jan. 2011, the content of which is incorporated herein by reference in its entirety.

BACKGROUND OF THE INVENTION

1. Field of the Invention

The invention relates to a switching converter and a method for regulating a clocked buck/boost converter, wherein a buck converter switching element is driven at a common clock frequency with a first pulse-width-modulated switching signal and a boost converter switching element is driven with a second pulse-width-modulated switching signal to convert an input voltage into a regulated output voltage, and wherein a regulator signal from an output voltage regulator is used to generate the pulse-width-modulated switching signals.

2. Description of the Related Art

Buck/boost converters have long been known. These devices essentially involve switching converters that operate alternately or in a transitional area simultaneously in the manner of a boost converter and in the manner of a buck converter. In a corresponding circuit arrangement, a common choke as well as a common output filter are provided. As a rule, the buck converter switching element is connected between the input voltage and the first terminal of the choke. The reference potential of the input voltage is connected, on one hand, to the reference potential of the output voltage and, on the other hand, via a first diode likewise to the first terminal of the choke. This second terminal of the choke is additionally connected via a second diode to the terminal of the output voltage (see FIG. 1). In this case, the diodes can also be embodied as synchronous switches.

If the input voltage exceeds the output voltage, the switching converter operates as a buck converter. As soon as the input voltage drops below the output voltage, conversion switches to the boost converter mode (see FIG. 2).

As a rule, the two switching elements are driven by pulse-width-modulated switching signals. To form these switching signals, a regulator signal of an output voltage regulator is mostly overlaid onto a sawtooth or triangular signal. An exemplary buck/boost converter is disclosed in patent application DE 43 06 070 C1, where two pulse-width-modulated signals are generated with only one regulator signal. In this case, one sawtooth signal is displaced in relation to the second sawtooth signal by a value equal to the amplitude. This means that with an increasing regulator output signal, the duty cycle of the first pulse-width-modulated switching signal for driving the buck converter amounts to 100% before the second switching signal delivers first switching impulses to the boost converter.

To compensate for voltage drops in the components of the switching converter, methods are also known in which the two sawtooth signals are displaced by a value equal to the amplitude minus a correction value. Such overlaying of the sawtooth signals for realizing an overlapping operation of the boost and buck converter is known from U.S. Pat. No. 6,166,527 A. It is known from WO 2009/033924 A2 that, during a transition from buck converter operation to boost converter operation, the boost converter switching element can be synchronized with an earlier clocking. In this case, a further pulse-width-modulated switching signal is generated that specifies an earlier clocking on transition.

A fault-free transition between the two operating modes is, as a rule, only possible if the switching elements of the buck/boost converter are connected in a continuous mode. The common choke in this case always remains magnetically charged and no resonance oscillations occur, which conventionally occur after the magnetization of the choke has taken place. The respective switching element is switched into a discontinuous mode after the choke has been de-magnetized. A dead time thus occurs. According to the prior art, the aim in a discontinuous mode is quasi-resonant switching (i.e., valley switching). In this case, the switching element is switched on when the voltage oscillating at a resonant frequency at the switched off switching element is at a minimum. In this way, turn-on losses are kept low.

With a generic buck/boost converter, unspecified resonance events within existing resonant circuits can lead to faults. Such faults involve increased losses, for example, because no valley switching can occur. In addition, faults occurring can lead to undesired noise emissions.

SUMMARY OF THE INVENTION

It is an object of the present invention to provide a method for fault-free operation in a discontinuous mode. A further object is to provide a buck/boost converter for implementating the method.

These and other objects and advantages are achieved in accordance with the invention by a method and a buck/boost converter which is operated in a discontinuous mode with valley switching, where the inductor current or the current detected by the buck converter switching element is compared with a reference current, where the regulator signal is amplified to the extent that the reaching of the reference current occurs temporally before a turn-off impulse of the first pulse-width-modulated switching signal and where the second pulse-width-modulated switching signal is created by the amplified regulator signal.

The result of the described interventions into the regulation is that after a choke de-magnetization a unique resonance state always exists, which facilitates fault-free valley switching. A falling input voltage initially leads to the regulator signal increasing. An amplification of the regulator signal has the further consequence that the boost converter switching element begins to clock earlier when the input voltage is approaching the output voltage. Overlaps occur the overlaying with a consistent sawtooth or triangular signal, which determine the turn-on and turn-off times. The overlaps occur earlier than with the non-amplified regulator signal. In such cases, the non-amplified regulator signal in such is also included for generating the first pulse-width-modulated switching signal for the buck converter switching signal.

The earlier activation of the boost converter leads to the output voltage regulator specifying a lower regulator signal to regulate the output voltage to a desired nominal value. The buck converter switching element continues to clock, while the input voltage drops below the output voltage. This further forced switching-off of the buck converter switching element has the effect that a parasitic capacitor of this buck converter in switching element continues to charge. The parasitic capacitor forms a resonant circuit together with the choke inductance and a parasitic capacitor of the boost converter switching element. The voltage minima occurring in such cases at the switching elements are used to valley switch the buck/boost converter.

Without the specified measure, an undefined state would arise during the transition from buck converter operation to boost converter operation. Depending on whether the buck converter switching element is still switching off or already remains fully switched on during a switching cycle, the charge state of the parasitic capacitor of the buck converter switching element would vary continuously. This would result in a resonance behavior of the resonant circuit differing from clock cycle to clock cycle. A valley switching would no longer be possible.

It is advantageous for any current that is currently required for charging a parasitic capacitor of the buck converter input voltage switching element up to the value of the input voltage to be specified as a reference current. Intervention into the regulation remains restricted to a minimum level without adversely affecting the desired effect.

It is also advantageous for a comparison signal to be formed by a comparison between the inductor current or the current through the buck converter switching element and the reference current, which features a comparison pulse when the inductor current or the current through the buck converter switching element reaches the value of the reference current. Such a signal is able to be generated by a simple circuit structure.

In an advantageous embodiment of the method, a phase difference signal is formed by a phase evaluation of the first pulse-width-modulated switching signal and the comparison signal, the phase difference signal is equal to zero in this case if, within a switching cycle, the comparison pulse of the comparison signal occurs temporally after the turn-off pulse of the first pulse-width-modulated switching signal and the phase difference signal increases proportionally with the temporal difference between comparison pulse of the comparison signal and turn-off pulse of the first pulse-width-modulated switching signal, if within a switching cycle the comparison pulse of the comparison signal occurs in time before the turn-off pulse of the first pulse-width-modulated switching signal. The phase difference signal is able to be used for amplification of the regulator signal.

It is particularly worthwhile to realize the amplification in a way in which the phase difference signal and the regulator signal are added to create an amplified regulator signal.

A further improvement during transition from buck converter operation to boost converter operation is provided when the boost converter switching element is driven such that, when the falling input voltage approaches a smaller output voltage, the boost converter switching element begins to clock with an increasing duty cycle, before the input voltage is equal to the output voltage. In this way, it is ensured during each transition from buck converter to boost converter operation that the boost converter switching element already begins to clock with very short turn-on times when the output voltage approaches the input voltage. This occurs independently of the curve of the second pulse-width-modulated switching signal, which is generally created by overlaying a sawtooth or triangular signal with the regulator signal. This measure leads to the curve of the current in the choke of the buck converter running continuously in the transition phase from buck converter to boost converter operation.

The buck/boost converter in accordance with the disclosed embodiments of the invention for performing one of the methods described above makes provision for a regulator signal of an output voltage regulator to be supplied together with a sawtooth or triangular signal to a first pulse-width modulator, at the output of which the first pulse-width-modulated switching signal for driving the buck converter switching element is present and where a further sawtooth or triangular signal, essentially offset by one amplitude of the sawtooth or triangular signal, is fed to a second pulse-width modulator, at the output of which the second pulse-width-modulated switching signal for driving the boost converter switching element is present. In this case, the inductor current or the current through the buck converter switching element and a reference current are fed to a comparator, where the comparison signal at the output of the comparator and the first pulse-width-modulated switching signal are fed to a phase evaluation module, and where the phase difference signal is present at the output of the phase evaluation module and whereby the regulator signal amplified with the phase difference signal is fed to the second pulse-width modulator. This produces a simpler structure which is able to be realized both with discrete components and also by means of an integrated circuit.

Advantageously, the phase evaluation module comprises the function module of a microcontroller. As an alternative to this, a flip-flop circuit with a downstream located smoothing stage is provided.

To generate the second pulse-width-modulated switching signal, it is advantageous for the phase difference signal and the regulator signal to be fed to an adding element and for the amplified regulator signal present at the output of the adding element to be fed to the second pulse-width modulator. For a fault-free transition from buck converter to boost converter operation, it is also advantageous for a third pulse-width-modulator to be provided, to which the sawtooth or triangular signal and an output signal of a transition controller are fed and which, together with the second pulse-width modulator, is connected to the boost converter switching element via a logical OR circuit. By means of the output signal of the transition controller, the third pulse-width modulator generates a pulse-width-modulated signal independently of the regulator signal which, in the transition area from buck converter to boost converter operation, allows the boost converter switching element to clock earlier than would be the case as a result of the second pulse-width-modulated switching signal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below by way of examples which refer to the enclosed figures in which.

DETAILED DESCRIPTION OF THE PREFERRED EMBODIMENTS

Figure 1:
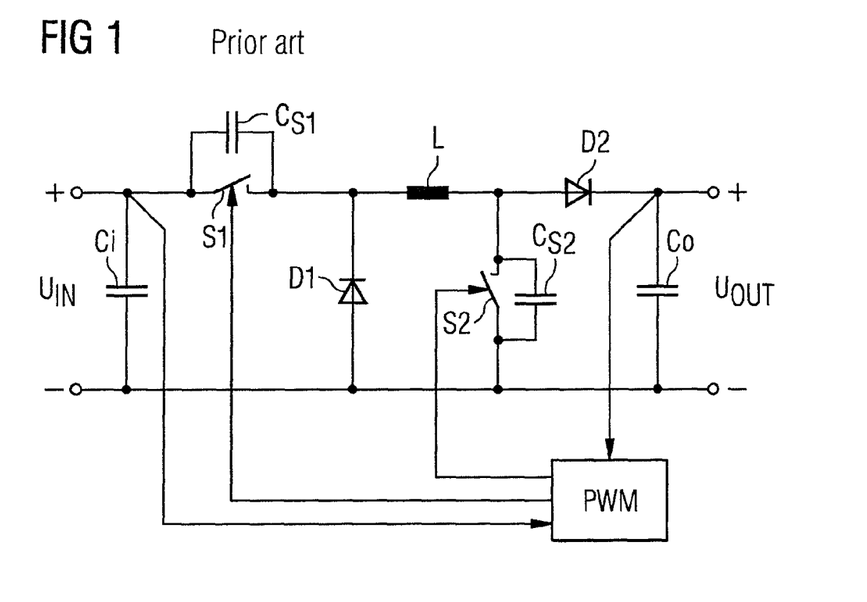
FIG. 1 shows schematic illustration of a buck converter in accordance with the prior art.

FIG. 1 shows a known power section of a buck/boost converter that comprises a choke L, which is connected via a buck converter switching element S1 to an input voltage $U_{IN}$. An output voltage $U_{OUT}$ and the input voltage $U_{IN}$ are related to the same reference potential. In this case, an input capacitor Ci and an output capacitor Co are conventionally provided. A first diode D1 is connected between reference potential and a connection between choke L and buck converter switching element S1. This becomes conductive in buck converter operation when the buck converter switching element S1 switches off. On the output side, the choke L is connected via a second diode D2 to the positive output of the buck/boost converter. A connection between choke L and second diode D2 is connected via a boost converter switching element S2 to the reference potential. The two switching elements S1, S2 each have a parasitic capacitor $C_{S1}$, $C_{S2}$ and are driven by means of the pulse-width modulator control PWM. To regulate the output voltage $U_{OUT}$ the pulse-width modulator control PWM is supplied with both the output voltage $U_{OUT}$ and also the input voltage $U_{IN}$ (FIG. 1).

Figure 2:
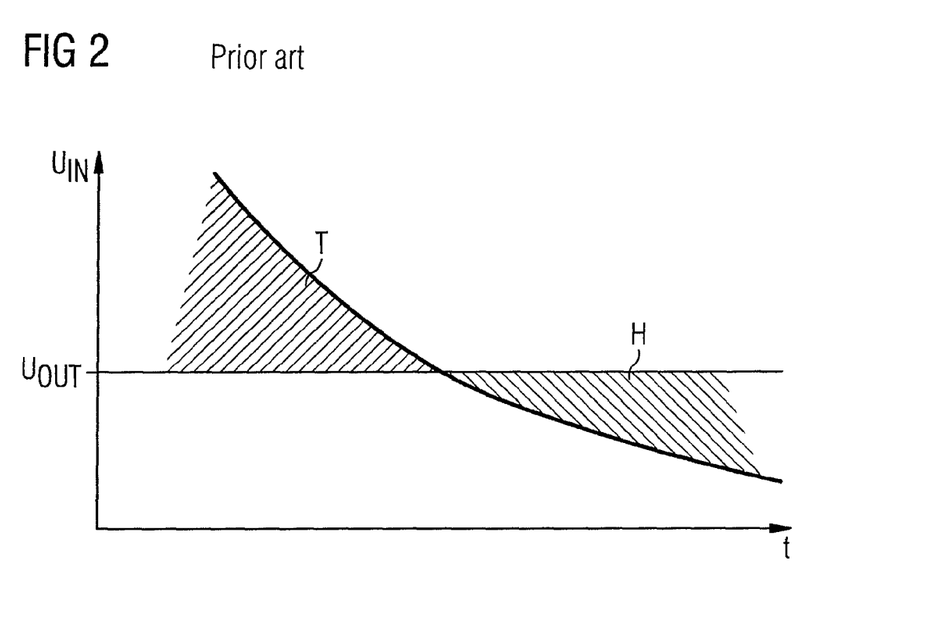
FIG. 2 shows a graphical plot of the voltage curve of a conventional buck/boost converter.

As shown in FIG. 2, as soon as the input voltage $U_{IN}$ drops below the output voltage $U_{OUT}$, a transition occurs from buck converter operation T to boost converter operation H.

In a discontinuous operating mode, the parasitic capacitors $C_{S1}$, $C_{S2}$ along with the inductance of the choke L form a resonant circuit. In order to avoid an undefined resonant behavior occurring during the transition from buck converter operation T to boost converter operation H, there is an inventive intervention into the control.

Figure 3:
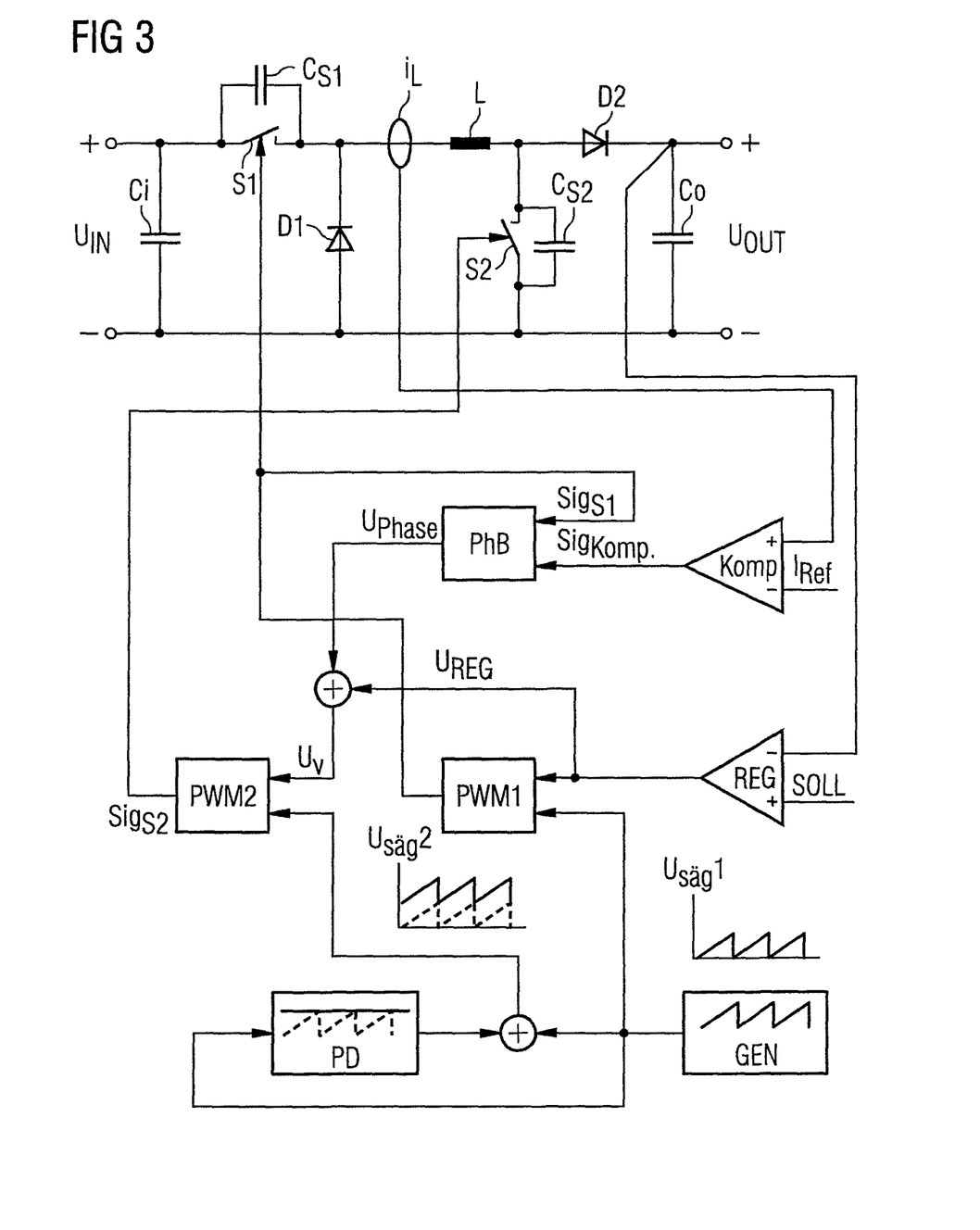
FIG. 3 shows a schematic block diagram of a buck/boost converter without transition controller in accordance with the invention.

An embodiment of the present invention is shown in FIG. 3. The power section of the buck/boost converter remains unchanged. As well as the output voltage $U_{OUT}$, a control section is supplied with the current through the choke L, referred to below as inductor current $i_L$. In particular, this inductor current $i_L$ is compared in a comparator Komp with a reference current $I_{Ref}$. By means of simple measurements, the value of the reference current $I_{Ref}$ is defined such that the parasitic capacitor $C_{S1}$ of the buck converter switching element S1 is charged up, each time the buck converter switching element S1 is switched off, to the voltage of the input capacitor Ci. As an alternative to the inductor current $i_L$, the current through the buck converter switching element S1 can also be included to define the appropriate turn-off time of the buck converter switching element S1.

In a transition area between buck converter and boost converter operation, the inductor current $i_L$ increases, for as long as the buck converter switching element S1 and the boost converter switching element S2 are switched on. After the boost converter switching element S2 switches off, the inductor current $i_L$ falls. In this case, the point in time is detected at which the inductor current $i_L$ reaches the value of the reference current $I_{Ref}$. This detection is undertaken by a comparison signal $Sig_{Komp}$ present at the output of the comparator Komp. The signal state of this comparison signal SigKomp is equal to one (1) for example, when the inductor current $i_L$ lies above the reference current $I_{Ref}$, and is equal to zero (0) when the inductor current $i_L$ is lower than the reference current $I_{Ref}$ (see, e.g., FIG. 4, FIG. 5). A switch from 1 to 0 thus signals that the reference current $I_{Ref}$ has been reached.

Figure 8:
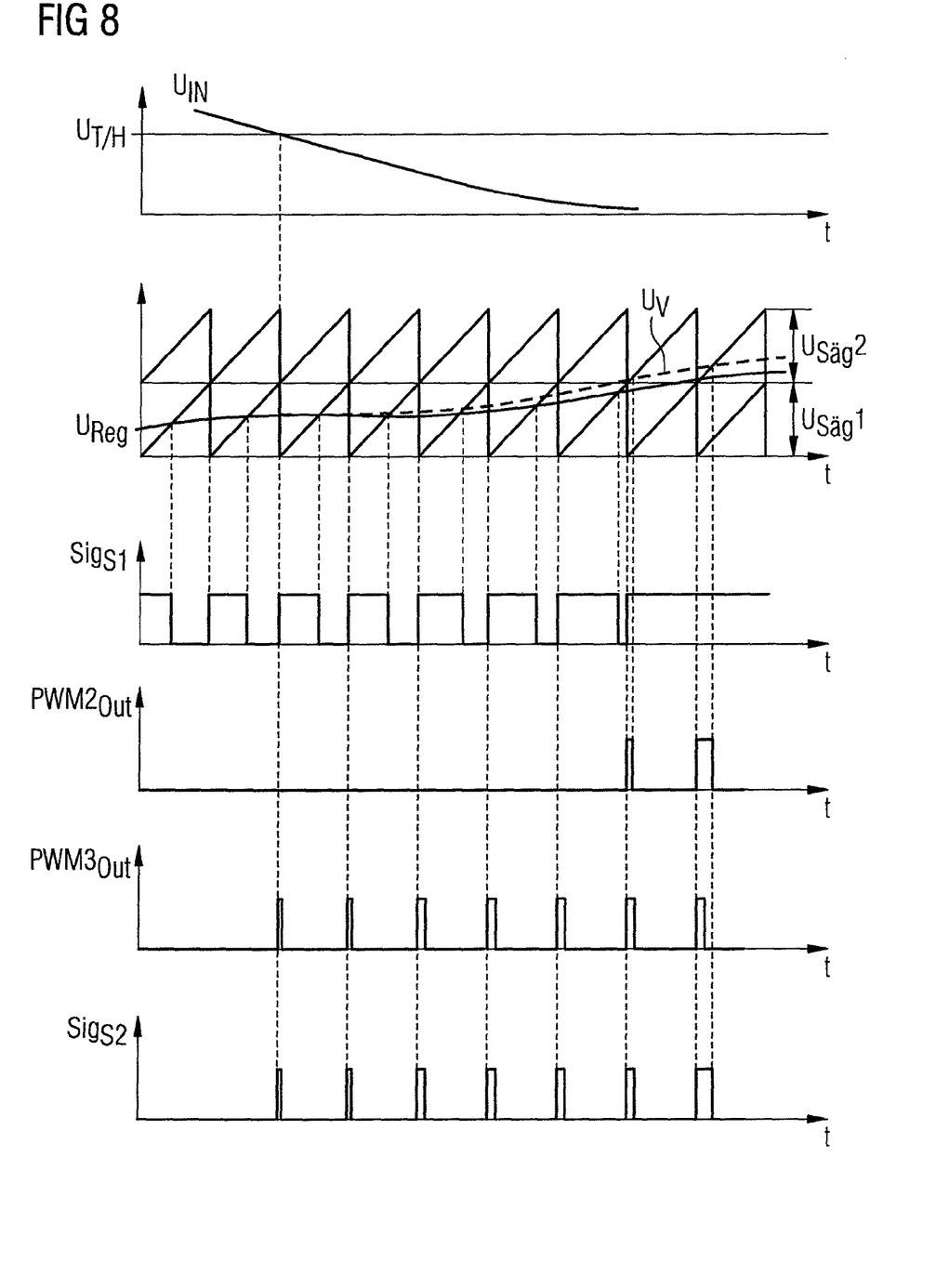
FIG. 8 shows a graphical plot of signal curves of the buck/boost converter of FIG. 7.

An output voltage regulator REG compares the output voltage $U_{OUT}$ with a required value SOLL. The regulation is described below by way of example for the case in which falling input voltage $U_{IN}$ drops below the output voltage $U_{OUT}$. Without regulation intervention, the output voltage $U_{OUT}$ also falls. To counteract this output voltage drop, the output voltage regulator REG specifies a higher regulator signal $U_{REG}$ (see FIG. 8). The regulator signal $U_{REG}$ is overlaid in a first pulse-width modulator PWM1 onto a first sawtooth signal $U_{säg}1$ of a signal generator GEN. The resulting pulse-width-modulated switching signal $Sig_{S1}$ serves to drive the buck converter element S1. The sawtooth signal $U_{säg}1$ is additionally fed to a peak detector PD for detecting a peak value signal of the sawtooth signal $U_{säg}1$. The sawtooth signal $U_{säg}1$ and the peak value signal are added in an adder to form an offset sawtooth signal $U_{säg}2$, which is fed to a second pulse-width modulator PWM2 for creating the second pulse-width-modulated switching signal $Sig_{S2}$. In this case, the offset sawtooth signal $U_{säg}2$ overlays the amplified regulator signal $U_V$. The same functionality is achieved when the signal generator GEN outputs a triangular signal instead of a sawtooth signal.

The extent of the regulator signal amplification depends on the length of the period of time between the point at which the inductor current $i_L$ achieves the value of the reference current $I_{Ref}$ and the turn-off time of the buck converter switching element S1. If the turn-off time occurs before the achievement of the reference current $I_{Ref}$, there is no amplification of the regulator signal $U_{REG}$.

Expediently the amplified regulator signal $U_V$ is formed by addition of the regulator signal $U_{REG}$ with a phase difference signal $U_{Phase}$.

Figure 4:
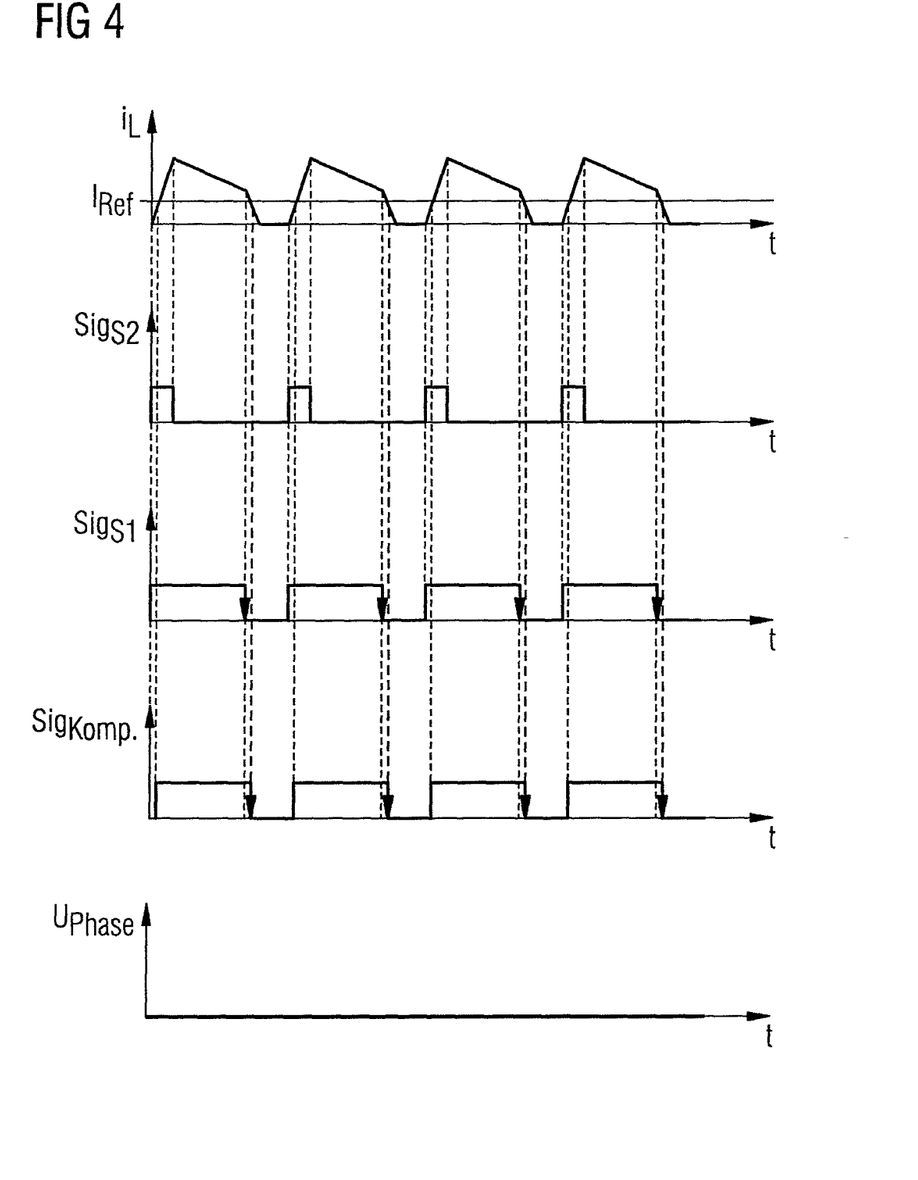
FIG. 4 shows a graphical plot of the curve of the switching signals over time without intervention into the regulation.
Figure 5:
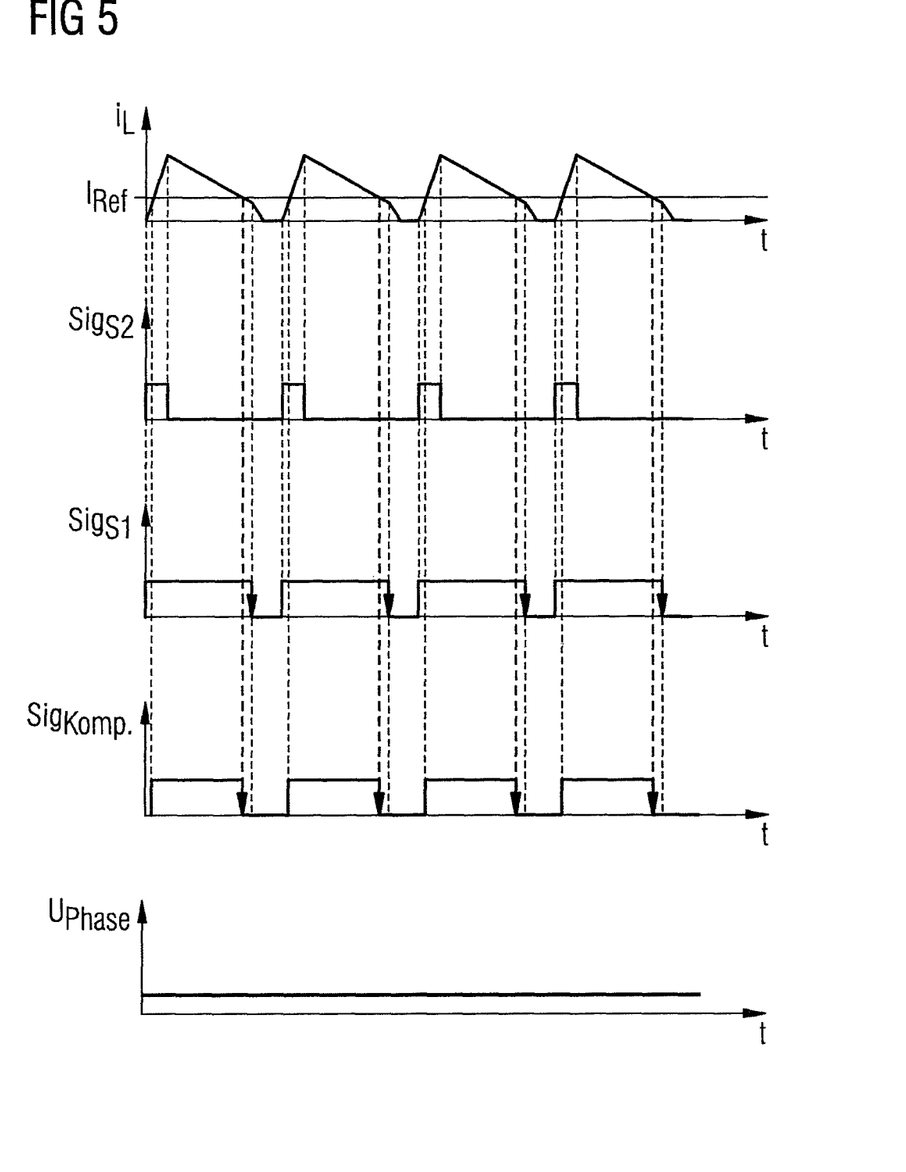
FIG. 5 show a graphical plot of the curve of the switching signals over time with intervention into the regulation of FIG. 3.

FIGS. 4 and 5 show graphical plots of the formation of the phase difference signal $U_{Phase}$. In the diagrams, the inductor current $i_L$, the first pulse-width-modulated switching signal $Sig_{S1}$, the second pulse-width-modulated switching signal $Sig_{S2}$, the comparison signal $Sig_{Komp}$ and the phase difference signal $U_{Phase}$ are plotted over time t. By comparing the inductor current $i_L$ with the reference current $I_{Ref}$, the comparison signal $Sig_{Komp}$ is formed, as described above. If a falling edge of the comparison signal $Sig_{Komp}$ occurs after the turn-off pulse of the first pulse-width-modulated switching signal $Sig_{S1}$ during a switching cycle, then the phase difference signal $U_{Phase}$ remains equal to zero (see FIG. 4).

By contrast, the phase difference signal $U_{Phase}$ is not equal to zero if during a switching cycle a falling edge of the comparison signal $Sig_{Komp}$ occurs before the turn-off pulse of the first pulse-width-modulated switching signal $Sig_{S1}$. The longer the period of time between the falling edge of the comparison signal $Sig_{Komp}$ and the turn-off pulse, then the greater the phase difference signal $U_{Phase}$ (see FIG. 5). The phase difference signal $U_{Phase}$ thus specifies by how much later the buck converter switching element S1 switches off, relative to the point in time at which the inductor current $i_L$ reaches the value of the reference current $I_{Ref}$. The formation of the phase difference signal is realized in a simple manner by use of a flip-flop circuit and a downstream smoothing stage.

As an alternative to this, the phase difference signal $U_{Phase}$ can be formed by a program implemented in a microcontroller.

The intervention into the regulation described below prevents the buck converter switching element S1 from switching off too late, so a sufficient residual current is always present to charge the parasitic capacitor $C_{S1}$. As soon as a phase difference signal $U_{Phase}$ not equal to zero occurs, the regulator signal $U_{REG}$ is amplified. The second pulse-width-modulated switching signal $Sig_{S2}$ is formed by the amplified regulator signal $U_V$. During the transition from buck converter to boost converter operation, the amplified regulator signal $U_V$ has the effect that the boost converter switching element S2 begins to clock earlier and with a longer turn-on duration than would be the case of formation by a non-amplified regulator signal $U_{REG}$. This causes the output voltage $U_{OUT}$ to increase and the output voltage regulator REG specifies a lower regulator signal $U_{REG}$, in order to match the output voltage $U_{OUT}$ to the required value SOLL again.

As a result of the lower regulator signal $U_{REG}$, the switch on duration of the buck converter switching element S1 reduces. The turn-off pulse occurs earlier per switching cycle, and the time interval to the falling edge of the comparison signal $Sig_{Komp}$ shortens until both pulses are synchronized. The effect of this regulation loop is that the phase difference signal $U_{Phase}$ again approaches zero.

Figure 6:
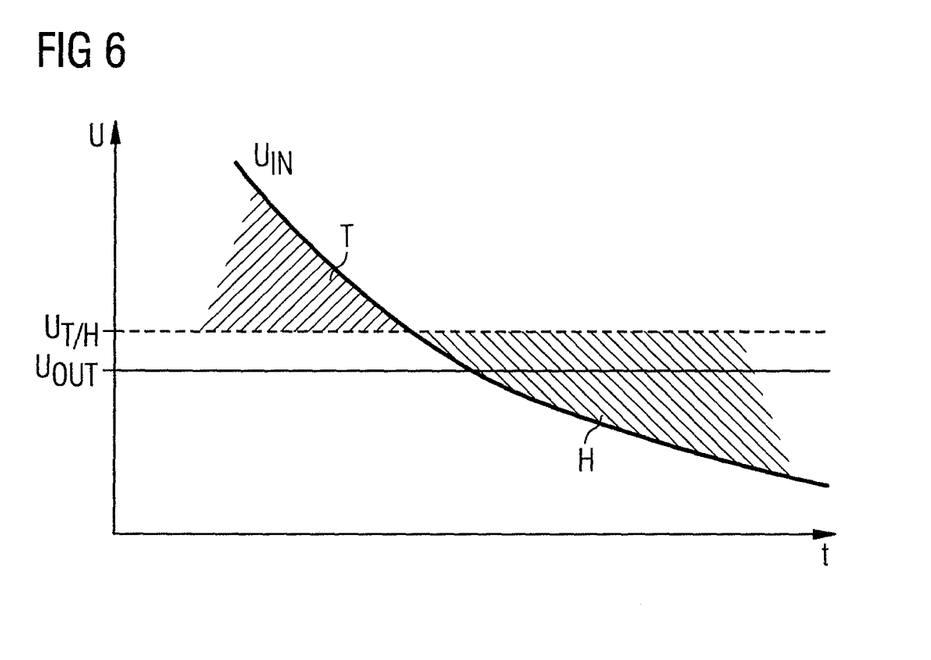
FIG. 6 shows a graphical plot of a voltage curve of an inventive buck/boost converter.

The described intervention into the regulation leads to the transition from buck converter operation T to boost converter operation H already beginning when the input voltage $U_{IN}$ drops below a voltage $U_{T/H}$ which lies above the output voltage $U_{OUT}$ (see FIG. 6). In addition, a switching-off of the buck converter switching element S1 also occurs during boost converter operation H.

Figure 7:
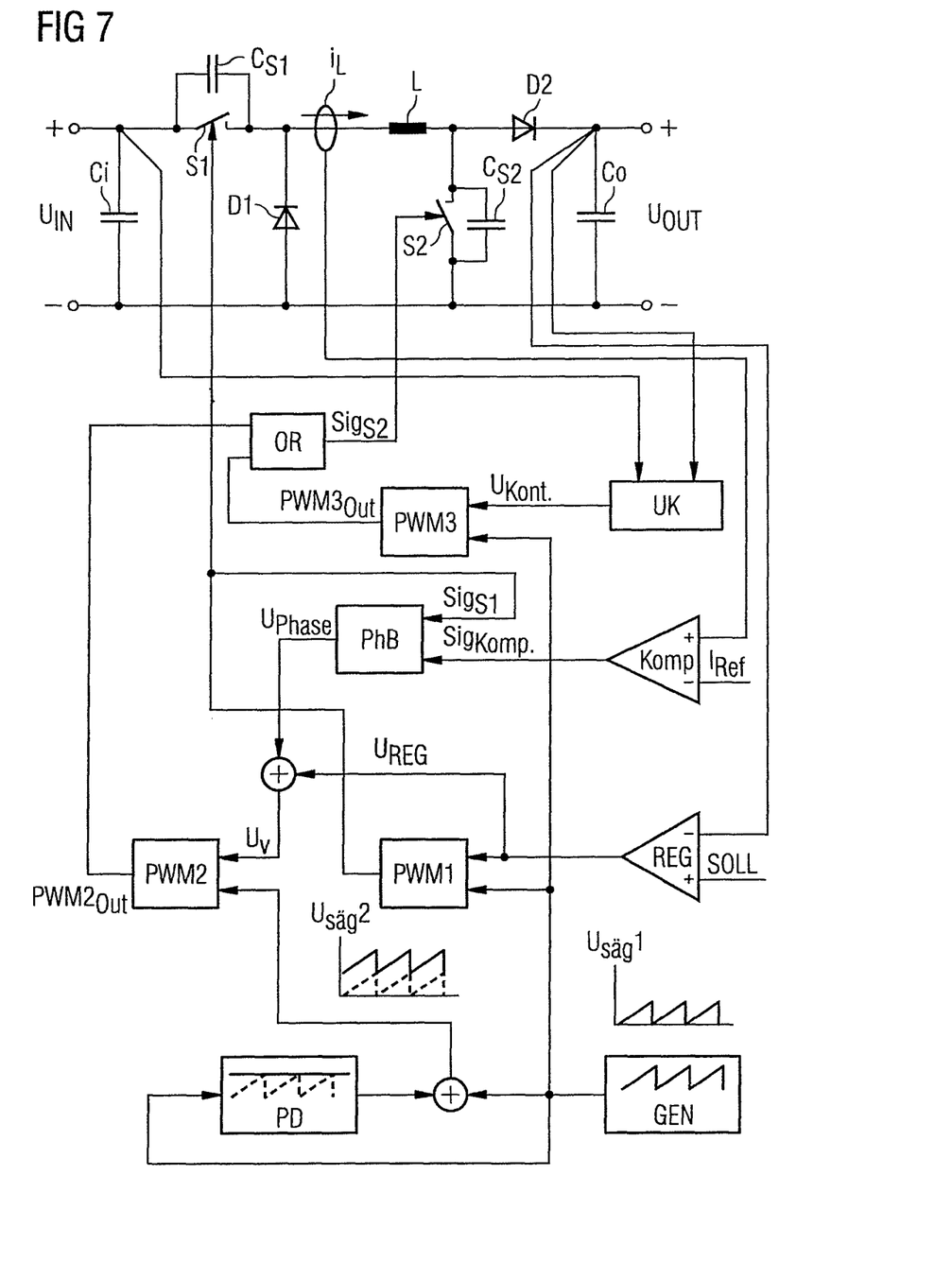
FIG. 7 shows a schematic block diagram of a buck/boost converter with transition controller.

FIG. 7 specifies a circuit layout which, during a transition from buck converter operation T to boost converter operation H, additionally causes a forced earlier clocking of the boost converter switching element S2, independent of the output signal of the second pulse width modulator PWM2. The corresponding signal traces are shown the graphical plot of in FIG. 8.

A second pulse-width-modulated output signal $PWM2_{OUT}$ is present unchanged at the second pulse-width modulator PWM2, which is formed from the further, offset sawtooth signal $U_{säg}2$ and the amplified regulator signal $U_V$. This output signal $PWM2_{OUT}$ is, however, no longer available directly as the second pulse-width-modulated switching signal $Sig_{S2}$. The formation of the first pulse-width-modulated switching signal $Sig_{S1}$ remains unchanged. In addition, there is the third pulse-width modulator PWM3, to which the sawtooth signal $U_{säg}1$ and an output signal $U_{UK}$ of a transition controller UK are fed.

The transition controller UK is, for example, an analog circuit or digital signal processor that maps a function of the output signal $U_{UK}$ via the difference between input voltage $U_{IN}$ and output voltage $U_{OUT}$. For example, an output signal $U_{OUT}$ is created when the input voltage $U_{IN}$ approaches a lower output voltage $U_{OUT}$ and the difference between input voltage $U_{IN}$ and output voltage $U_{OUT}$ drops below a lower limit value. The third pulse-width modulator PWM outputs a third pulse-width modulated output signal $PWM3_{OUT}$, which runs synchronously to the second pulse-width modulated output signal $PWM2_{OUT}$. However the turn-on pulses already occur with increasing turn-on duration when the input voltage $U_{IN}$ is approaching the output voltage $U_{OUT}$ and the second pulse-width-modulated output signal $PWM2_{OUT}$ does not yet exhibit any pulse.

The second pulse-width-modulated switching signal $Sig_{S2}$ for driving the boost converter switching element S2 is formed from the second pulse-width-modulated output signal $PWM2_{OUT}$ and the third pulse-width-modulated output signal $PWM3_{OUT}$ by a logical OR circuit.

This switching signal $Sig_{S2}$ corresponds to the third pulse-width-modulated output signal $PWM3_{OUT}$, until such time as the duration of the switching pulses become shorter than those of the synchronously running second pulse-width-modulated output signal $PWM2_{OUT}$. From this point in time onwards, the second pulse-width-modulated switching signal $Sig_{S2}$ corresponds to the second pulse-width-modulated output signal $PWM2_{OUT}$. The third pulse-width-modulated output signal $PWM3_{OUT}$ is thus only included for driving the boost converter switching element S2 when the difference between input voltage $U_{IN}$ and output voltage $U_{OUT}$ falls below the limit value of the difference and the second pulse-width-modulated output signal $PWM2_{OUT}$ is not yet delivering any turn-on times, which exceed those of the third pulse-width-modulated output signal $PWM3_{OUT}$. The boost converter switching element S2 is thus driven with the inclusion of the transition controller UK only in the short phases at the transition from buck converter to boost converter operation, without further influencing the regulation.

Figure 9:
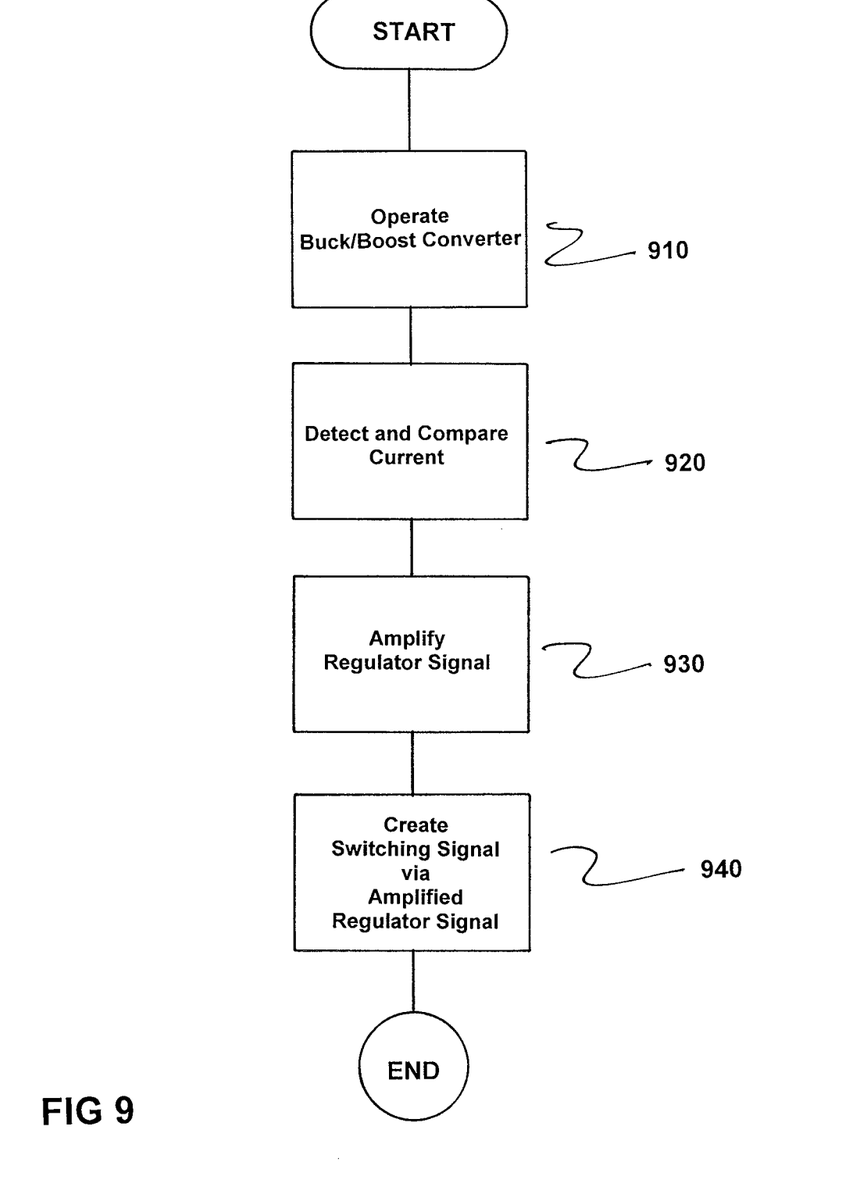
FIG. 9 is a flowchart of the method in accordance with the invention.

FIG. 9 is a flowchart of a method for regulating a clocked buck/boost converter, where a first buck converter switching element is driven with a common clock frequency having a first pulse width modulated switching signal and a second boost converter switching element is driven with a second pulse-width-modulated switching signal for conversion of an input voltage into a regulated output voltage, and a regulator signal of an output voltage regulator is used to create the first and second pulse-width-modulated switching signals.

The method comprises operating the clocked buck/boost converter in a discontinuous mode with valley switching, as indicated in step 910. Next, a choke current or a current through the first buck converter switching element is detected and compared with a reference current, as indicated in step 920.

The regulator signal is then amplified to an extent to which attainment of the reference current occurs temporally before a switch-off pulse of the first pulse-width-modulated switching signal, as indicated in step 930. The second pulse-width-modulated switching signal is then created via the amplified regulator signal, as indicated in step 940.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for regulating a clocked buck/boost converter, a first buck converter switching element being driven with a common clock frequency having a first pulse-width-modulated switching signal and a second boost converter switching element being driven with a second pulse-width-modulated switching signal for conversion of an input voltage into a regulated output voltage, and a regulator signal of an output voltage regulator being used to create the first and second pulse-width-modulated switching signals, the method comprising:

operating the clocked buck/boost converter in a discontinuous mode with valley switching;

detecting and comparing a choke current or a current through the first buck converter switching element with a reference current;

amplifying the regulator signal to an extent to which attainment of the reference current occurs temporally before a switch-off pulse of the first pulse-width-modulated switching signal; and creating the second pulse-width-modulated switching signal via the amplified regulator signal.

2. The method as claimed in claim 1, wherein the reference current comprises any current necessary to charge a parasitic capacitor of the buck converter switching element (S1) to a value of the input voltage.

3. The method as claimed in claim 1, further comprising:
comparing a choke current or the current through the buck converter switching element with the reference current, which includes a comparison pulse, when the choke current or the current through the buck converter switching element reaches a value of the reference current to form a comparison signal.

4. The method as claimed in claim 2, further comprising:
comparing one of the choke current and the current through the buck converter switching element with the reference current, which includes a comparison pulse, when the choke current or the current through the buck converter switching element reaches a value of the reference current to form a comparison signal.

5. The method as claimed in claim 3, further comprising:
performing a phase evaluation of the first pulse-width-modulated switching signal and the comparison signal to form a phase difference signal;
wherein the phase difference signal is equal to zero if, within a switching cycle, the comparison pulse of the comparison signal occurs temporally after the switch-off pulse of the first pulse-width-modulated switching signal; and
wherein the phase difference signal increases in proportion to a temporal difference between the comparison pulse of the comparison signal and the switch-off pulse of the first pulse-width-modulated switching signal if, within the switching cycle, the comparison pulse of the comparison signal occurs temporally before the switch-off pulse of the first pulse-width-modulated switching signal.

6. The method as claimed in claim 4, further comprising:
adding the phase difference signal and the regulator signal to create the amplified regulator signal.

7. The method as claimed in claim 1, further comprising:
driving the second boost converter switching element such that, when the falling input voltage approaches a smaller output voltage, the second boost converter switching element begins to clock with an increasing duty cycle, before the input voltage is equal to the regulated output voltage.

8. A buck/boost converter comprising:
an output voltage regulator;
a buck converter switching element;
a first pulse-width modulator, a regulator signal of the output voltage regulator being fed together with a sawtooth or triangular signal to the first pulse-width modulator, a first pulse-width-modulated switching signal being present at an output of the first pulse-width modulator for driving the buck converter switching element;
a second pulse-width modulator, a further sawtooth or triangular signal offset essentially by one amplitude of the sawtooth or triangular signal being fed to the second pulse-width modulator, and a second pulse-width-modulated switching signal being present at an output of the second pulse-width modulator for driving a boost converter switching element;
a comparator, a choke current or a current through the buck converter switching element and a reference current being fed to a comparator;
a phase evaluation module, a comparison signal at an output of the comparator and the first pulse-width-modulated switching signal being fed to the phase evaluation module;
wherein a phase difference signal is present at an output of the phase evaluation module; and
wherein the regulator signal amplified with the phase difference signal is fed to the second pulse-width modulator.

9. The buck/boost converter as claimed in claim 8, wherein the phase evaluation module comprises a functional module of a microcontroller.

10. The buck/boost converter as claimed in claim 8, further comprising:
an adding element, the phase difference signal and the regulator signal being fed to the adding element;
wherein the amplified regulator signal present at an output of the adding element is fed to the second pulse-width modulator.

11. The buck/boost converter as claimed in claim 8, further comprising:
an adding element, the phase difference signal and the regulator signal being fed to the adding element;
wherein the amplified regulator signal present at an output of the adding element is fed to the second pulse-width modulator.

12. The buck/boost converter as claimed in claim 9, further comprising:
a third pulse-width modulator;
a transition controller; and
a logical OR circuit, the sawtooth or triangular signal and an output signal of the transition controller being fed and which together with the second pulse-width modulator is connected via the logical OR circuit to the boost converter switching element.

* * * * *